(12) United States Patent
Yoon et al.

(10) Patent No.: US 10,410,094 B2
(45) Date of Patent: Sep. 10, 2019

(54) METHOD AND APPARATUS FOR AUTHORING MACHINE LEARNING-BASED IMMERSIVE (4D) MEDIA

(71) Applicant: ELECTRONICS AND TELECOMMUNICATIONS RESEARCH INSTITUTE, Daejeon (KR)

(72) Inventors: Hyunjin Yoon, Daejeon (KR); Siadari T. Suprapto, Daejeon (KR); Hoon Ki Lee, Daejeon (KR); Mi Kyong Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/724,118

(22) Filed: Oct. 3, 2017

(65) Prior Publication Data

US 2018/0096222 A1   Apr. 5, 2018

(30) Foreign Application Priority Data

Oct. 4, 2016 (KR) .................. 10-2016-0127788

(51) Int. Cl.
*G06K 9/00* (2006.01)
*G06K 9/62* (2006.01)
*G06K 9/46* (2006.01)

(52) U.S. Cl.
CPC ......... *G06K 9/627* (2013.01); *G06K 9/00744* (2013.01); *G06K 9/4609* (2013.01);
(Continued)

(58) Field of Classification Search
CPC .... G06K 9/627; G06K 9/6215; G06K 9/6256; G06K 9/6277; G06K 9/6261;
(Continued)

(56) References Cited

U.S. PATENT DOCUMENTS

2010/0275235 A1   10/2010  Joo et al.
2011/0123168 A1*   5/2011  Cho .................. H04N 5/765
                                              386/230
(Continued)

FOREIGN PATENT DOCUMENTS

KR         10-0991368 B1    11/2010
KR      10-2013-0067649 A    6/2013
KR      10-2014-0035713 A    3/2014

OTHER PUBLICATIONS

Thomhert S. Siadari et al., "4D Effect Classification by Encoding CNN Features", IEEE Signal Processing Society, Sep. 14, 2017, pp. 1-7, IEEE.

*Primary Examiner* — Jon Chang

(57) ABSTRACT

A method and an apparatus for authoring a machine learning-based immersive media are provided. The apparatus determines an immersive effect type of an original image of image contents to be converted into an immersive media by using an immersive effect classifier learned using an existing immersive media that the immersive effect is already added to an image, detects an immersive effect section of the original image based on the immersive effect type determination result, and generates metadata of the detected immersive effect section.

20 Claims, 6 Drawing Sheets

(52) U.S. Cl.
CPC ........ *G06K 9/6215* (2013.01); *G06K 9/6256* (2013.01); *G06K 9/6261* (2013.01); *G06K 9/6277* (2013.01); *G06K 9/00758* (2013.01); *G06K 9/00765* (2013.01); *G06K 2009/00738* (2013.01); *G06K 2209/27* (2013.01)

(58) Field of Classification Search
CPC ........... G06K 9/00765; G06K 9/00758; G06K 2209/27; G06K 2009/00738; G06K 9/00744; G06K 9/4609
See application file for complete search history.

(56) References Cited

U.S. PATENT DOCUMENTS

| | | | |
|---|---|---|---|
| 2011/0227824 A1* | 9/2011 | Zhou | G06F 3/013 345/157 |
| 2012/0239712 A1* | 9/2012 | Lee | G11B 27/034 707/821 |
| 2014/0082465 A1 | 3/2014 | Jee et al. | |
| 2015/0004576 A1* | 1/2015 | Yoon | A61B 5/7264 434/236 |
| 2015/0324701 A1 | 11/2015 | Park et al. | |
| 2016/0019471 A1 | 1/2016 | Shin et al. | |
| 2016/0182771 A1* | 6/2016 | Oh | G06T 7/73 348/578 |

\* cited by examiner

METHOD AND APPARATUS FOR AUTHORING MACHINE LEARNING-BASED IMMERSIVE (4D) MEDIA

CROSS-REFERENCE TO RELATED APPLICATION

This application claims priority to and the benefit of Korean Patent Application No. 10-2016-0127788 filed in the Korean Intellectual Property Office on Oct. 4, 2016, the entire contents of which are incorporated herein by reference.

BACKGROUND OF THE INVENTION (a) Field of the Invention

The present invention relates to an immersive (4D) media, and more particularly, to a method and an apparatus for authoring a machine learning-based immersive (4D) media.

(b) Description of the Related Art

An immersive media is digital contents to which an immersive effect is added, and is provided to a three dimension (3D) image together with various special effects such as wind, a motion of chair, splashing of water, and the like. The immersive media is a media that provides five senses information such as sight, hearing, smell, taste, and tactile senses, and sensitivity information that may maximize immersion and realism without time-spatial restriction to improve satisfaction of a user, and is also called mulesmedia. The immersive media has an advantage in that it may maximize reality, realism, and immersion by being synchronized with the image and reproducing vibration, lighting, motion chair, and smell through a reproducing device.

An existing immersive media has been manually authorized in a way in which an expert adds the immersive effects to pre-photographed image contents so as to be matched to the image using an authoring tool for the purpose of screening at a 4D movie theater or an experience hall. However, such a manual authoring has a disadvantage in that the authoring of the immersive media is limited to some skilled experts.

A technology has been recently disclosed that may additionally obtain immersive effect related information through various sensors during the photographing of the image, and automatically generate the immersive effect based on the obtained immersive effect related information to thereby authorize the immersive media. However, such a technology has a limitation that it is applicable to only image contents having sensor information which is additionally obtained during the photographing of the image.

Therefore, there is a need for a method for automatically authoring an immersive media that anyone may easily convert general image contents which are previously photographed into the immersive media.

Meanwhile, a plurality of conventional immersive media authorized by the experts is data having rich information amount that embeds mapping information on the image and the added immersive effects, but there is no example of utilizing added information of the immersive media to automatically extract the immersive effect. Therefore, there is a need for a new method for automatically authoring an immersive media in a way of learning a model classifying the image into the immersive effect using the existing immersive media, and detecting the immersive effect by applying the learned model to a new image.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for authoring a machine learning-based immersive media having advantage of creating general image contents into an immersive media.

The present invention has been made in an effort to provide a method and an apparatus for authoring a machine learning-based immersive media having advantage of authoring an immersive media by automatically determining an immersive effect type for a new image using a learned immersive effect classifier.

An exemplary embodiment of the present invention provides an apparatus for authoring an immersive media, including: an immersive effect classifying unit determining an immersive effect type of an original image of image contents to be converted into an immersive media by using an immersive effect classifier learned using an existing immersive media that the immersive effect is already added to an image; an immersive effect section detecting unit detecting an immersive effect section of the original image based on the immersive effect type determination result of the immersive effect classifying unit; and an immersive media generating unit generating metadata of the detected immersive effect section.

The immersive effect classifying unit may obtain a prediction value that predicts a degree that the original image corresponds to any immersive effect type using the learned immersive effect classifier.

The immersive effect classifying unit may determine the immersive effect type having the greatest prediction value among the prediction values predicted for each of the immersive effect types for the original image, as the immersive effect type of the original image.

The apparatus may further include an image dividing unit dividing the original image into a plurality of image pieces, wherein the immersive effect classifying unit classifies each image piece into any immersive effect type.

The image dividing unit may divide the original image into shots including a plurality of consecutive frames which are visually similar to each other, based on similarity of visual characteristic information between image frames, obtain a non-conversation scene including consecutive shots and positioned between conversation scenes based on caption information of the image contents, and divide the non-conversation scene into a plurality of image pieces.

When a reproduction time interval of captions included in two consecutive shots is shorter than a preset threshold value by using a caption reproduction time of the caption information corresponding to a time section of the shot, the image dividing unit may determine the consecutive shots as the shots corresponding to consecutive conversation scenes, and obtain the non-conversation scene positioned between the determined conversation scenes and including the consecutive shots.

The image dividing unit may divide the plurality of shots corresponding to the non-conversation scene in a sliding window way to obtain the plurality of image pieces.

The immersive effect section detecting unit may detect the maximum image section of a corresponding immersive effect type by matching the image pieces having the same immersive effect type based on the immersive effect type classification result for each image piece, and the detected maximum image section may include a plurality of shots belonging to the non-conversation scene.

The immersive effect section detecting unit may determine the maximum image section by taking into account the minimum classification prediction numerical value of the immersive effect type, the minimum size of the detection section, and whether or not heterogeneous immersive effect types overlap with each other. The metadata of the detected immersive effect section may include an immersive effect type, an immersive effect start time, and an immersive effect end time.

The apparatus may further include an immersive media learning processing unit learning the immersive effect classifier that classifies an input image into the immersive effect type by using the existing immersive media that the immersive effect is already added to the image to provide the learned immersive effect classifier.

The immersive media learning processing unit may include an immersive effect classifier learning unit learning the immersive effect classifier using training data including digital image and an immersive effect label, which is immersive effect information added to the image, to obtain the learned immersive effect classifier, based on a machine learning algorithm.

The immersive effect label of the training data may include an immersive effect type, an immersive effect start time, and an immersive effect end time, and may further include at least one of immersive effect intensity, an immersive effect direction, and an immersive effect period according to the immersive effect type.

The digital image of the training data may include a plurality of image pieces which are divided according to the immersive effect start time and the immersive effect end time of the immersive effect label.

Another embodiment of the present invention provides a method for authoring an immersive media by an apparatus for authoring an immersive media, including dividing an original image to be converted into the immersive media into a plurality of image pieces for an immersive effect classification; determining an immersive effect type for each of the image pieces by using an immersive effect classifier learned using an existing immersive media that the immersive effect is already added to an image; detecting an immersive effect section based on the immersive effect classification result for each of the image pieces; and generating metadata of the detected immersive effect section.

The dividing of the original image into the plurality of image pieces may include dividing the original image into shots including a plurality of consecutive frames which are visually similar to each other, based on similarity of visual characteristic information between image frames; obtaining a non-conversation scene positioned between conversation scenes and including consecutive shots based on caption information of the original image; and dividing the non-conversation scene into the plurality of image pieces.

The method may further include determining the immersive effect type; obtaining a prediction value that predicts a degree that the image piece corresponds to any immersive effect type by using the learned immersive effect classifier; and determining the immersive effect type having the greatest prediction value among the prediction values predicted for each of the immersive effect types for the image piece, as the immersive effect type of the image piece.

The detecting of the immersive effect section may include detecting the maximum image section of a corresponding immersive effect type by matching the image pieces having the same immersive effect type based on the immersive effect type classification result for each of the image pieces. In the generating of the metadata, metadata including an immersive effect type, an immersive effect state time, and an immersive effect end time of the maximum image section may be generated.

In the detecting of the maximum image section, a section which is shorter than the minimum size of a set detection section, a section in which the prediction value of the immersive effect type is smaller than the minimum classification prediction numerical value, and a section which overlaps with a section of another immersive effect type among sections detected based on the image pieces may be excluded from a section detection result.

The detecting of the immersive effect section may include detecting an immersive effect section in which a start time and an end time of the immersive effect are determined, based on the immersive effect type classification result for the image pieces. In the generating of the metadata, metadata including an immersive effect type, an immersive effect state time, and an immersive effect end time of the immersive effect section may be generated.

DETAILED DESCRIPTION OF THE EMBODIMENTS

Figure 1:
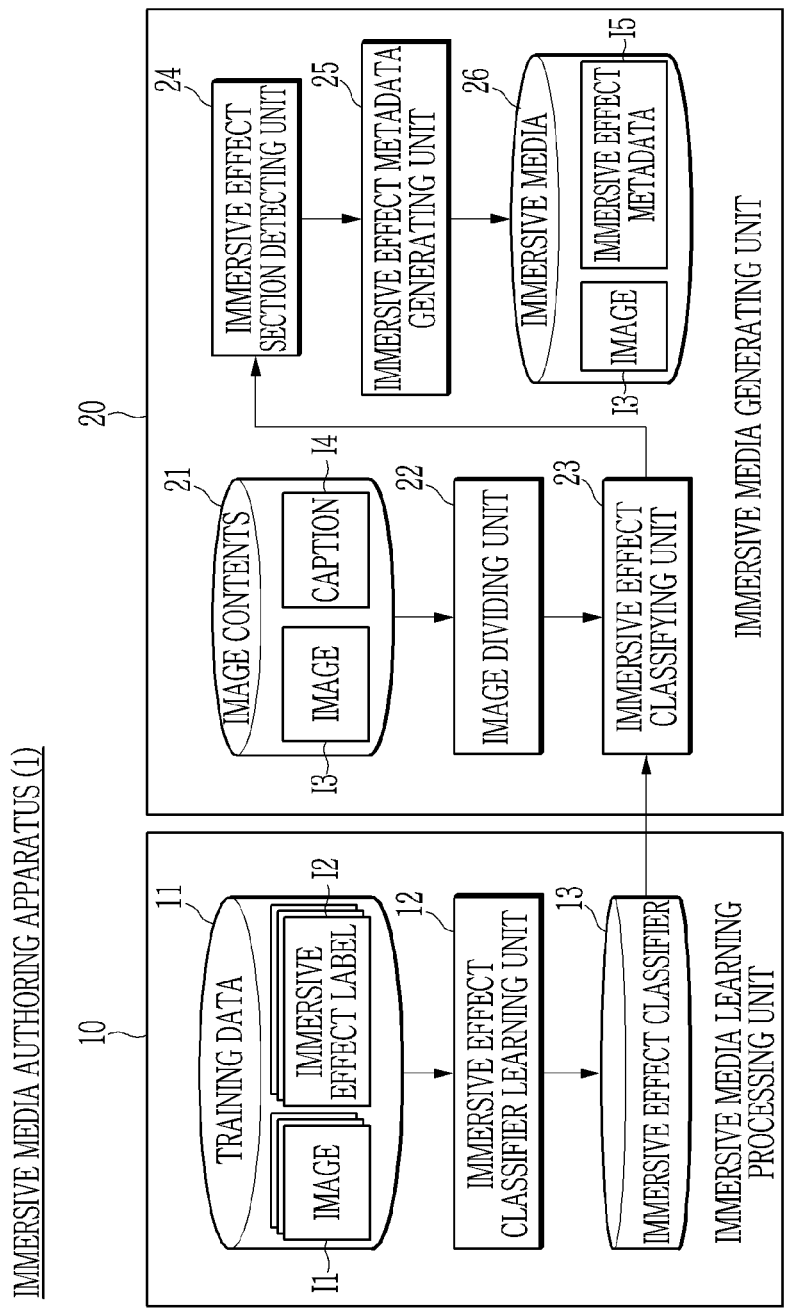
FIG. 1 is a diagram illustrating a structure of an apparatus for authoring a machine learning-based immersive media according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

Hereinafter, a method and an apparatus for authoring an immersive media according to exemplary embodiments of the present invention will be described with reference to the accompanying drawings.

According to an exemplary embodiment of the present invention, an immersive media is authored by learning an immersive effect classifier that classifies an image for each of immersive effects using an existing immersive media (the existing immersive media represents digital contents that have already been created by adding the immersive effect to the image) and applying the learned immersive effect classifier to a new image to thereby detect the immersive effect. A machine learning is used to learn a model, and the machine learning refers to a technology of completing a generalized model that solves a problem from a large amount of training data and has an advantage in that it is applicable only if it has accumulated data.

FIG. 1 is a diagram illustrating a structure of an apparatus for authorizing a machine learning-based immersive media according to an exemplary embodiment of the present invention.

As illustrated in FIG. 1, an apparatus 1 for authoring a machine learning-based immersive media (referred to as an immersive media authoring apparatus, for convenience of explanation) according to an exemplary embodiment of the present invention includes an immersive media learning processing unit 10 and an immersive media generating unit 20. The immersive media learning processing unit 10 performs a process of learning the immersive effect classifier that classifies an input image into an immersive effect type using the existing immersive media. The immersive media generating unit 20 determines the immersive effect type corresponding to a new input image using the learned immersive effect classifier of the immersive media learning processing unit 10 to detect a maximum section of the immersive effect, and generates immersive effect metadata based on the detected maximum section.

Meanwhile, the immersive media learning processing unit 10 specifically includes a training data storing unit 11 and an immersive effect classifier learning unit 12, and further includes an immersive effect classifier 13, as illustrated in FIG. 1.

The training data storing unit 11 is configured to store training data, and the training data includes a digital image I1 and an immersive effect label I2 that represents the immersive effect which is added to the digital image. The immersive effect label I2 includes an immersive effect type, an immersive effect start time, and an immersive effect end time, and may further include immersive effect intensity, an immersive effect direction, and an immersive effect period depending on the immersive effect type. A plurality of images I1 constituting the training data may include image pieces which are divided in parallel with the immersive effect start time and the immersive effect end time of the immersive effect label I2.

The immersive effect classifier learning unit 12 is configured to obtain the immersive effect classifier 13 that classifies the image into the immersive effect type using the training data, and specifically obtains the learned immersive effect classifier 13 by learning the immersive effect classifier 13 that classifies the image of the training data for each of the immersive effects, based on a machine learning algorithm.

The immersive effect classifier 13 is configured to determine the immersive effect type corresponding to the new input image and classify the input image for each of the immersive effect types. The immersive effect classifier 13 may predict a degree that the input image corresponds to a specific immersive effect type, as a numerical value. Further, the immersive effect classifier 13 may classify the input image into one immersive effect type based on the predicted numeric value. For example, in a case in which three kinds of immersive effect types such as a motion effect, a vibration effect, and a wind effect are determined, the immersive effect classifier 13 may predict the degree that the input image is classified into the three kinds of immersive effect types, as 0.1, 0.75, and 0.15, respectively, and may classify the input image into the vibration effect having the highest prediction score.

Meanwhile, the immersive media generating unit 20 specifically includes a contents storing unit 21, an image dividing unit 22, an immersive effect classifying unit 23, an immersive effect section detecting unit 24, an immersive effect metadata generating unit 25, and an immersive media storing unit 26, as illustrated in FIG. 1.

The contents storing unit 21 is configured to store image contents, and the image contents include an image I3 to be converted into the immersive media and caption information I4 of the image.

The image dividing unit 22 is configured to divide the image of the image contents into a plurality of image pieces for immersive effect classification.

The immersive effect classifying unit 23 is configured to determine the immersive effect type of the image by using the immersive effect classifier 13 obtained by the learning. Specifically, the immersive effect classifying unit 13 determines the immersive effect type for each of the image pieces of the image contents which are provided from the image dividing unit 22. The immersive effect types include, for example, a motion effect, a vibration effect, and a wind effect, but are not limited thereto.

The immersive effect section detecting unit 24 is configured to detect an immersive effect section based on the immersive effect classification result for the plurality of image pieces, and is particularly configured to find the maximum image section of the same immersive effect type by matching the classification result. A detailed description thereof will be provided below.

The immersive effect metadata generating unit 25 is configured to generate immersive effect metadata for the detected immersive effect section. The immersive effect metadata includes an immersive effect type, an immersive effect start time, and an immersive effect end time.

The immersive media is generated based on the image I3 of the image contents and the immersive effect metadata I5 obtained from the immersive effect metadata generating unit 25, and the immersive media generated as described above is stored in the immersive media storing unit 26.

Next, a method for authoring an immersive media according to an exemplary embodiment of the present invention using the immersive media authoring apparatus 1 having the structure described above will be described.

Figure 2:
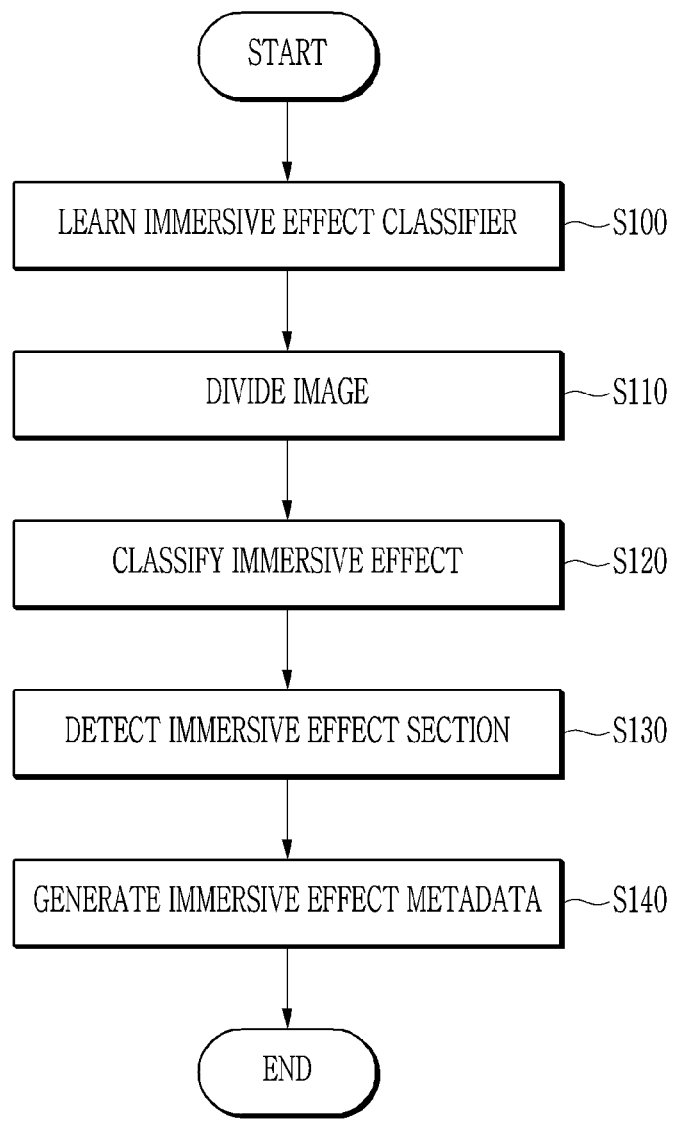
FIG. 2 is a flowchart of a method for authoring an immersive media according to an exemplary embodiment of the present invention.

FIG. 2 is a flowchart of a method for authoring an immersive media according to an exemplary embodiment of the present invention.

As illustrated in FIG. 2, the immersive media authoring apparatus 1 according to the exemplary embodiment of the present invention learns the immersive effect classifier using the existing immersive media and obtains the learned immersive effect classifier (S100). The immersive effect classifier 13 performs a learning that classifies the digital image into the immersive effect types by using the machine learning algorithm, for the training data including the digital image I1 corresponding to the existing immersive media and the immersive effect label I2, thereby obtaining the learned immersive effect classifier 13.

The immersive media authoring apparatus 1 converts the new input image into the immersive media by using the learned immersive effect classifier 13. To this end, in the image contents including the image I3 to be converted into the immersive media and the caption information I4, the image I3, that is, an original image is first divided into the plurality of image pieces for the immersive effect classification (S110).

Figure 3:
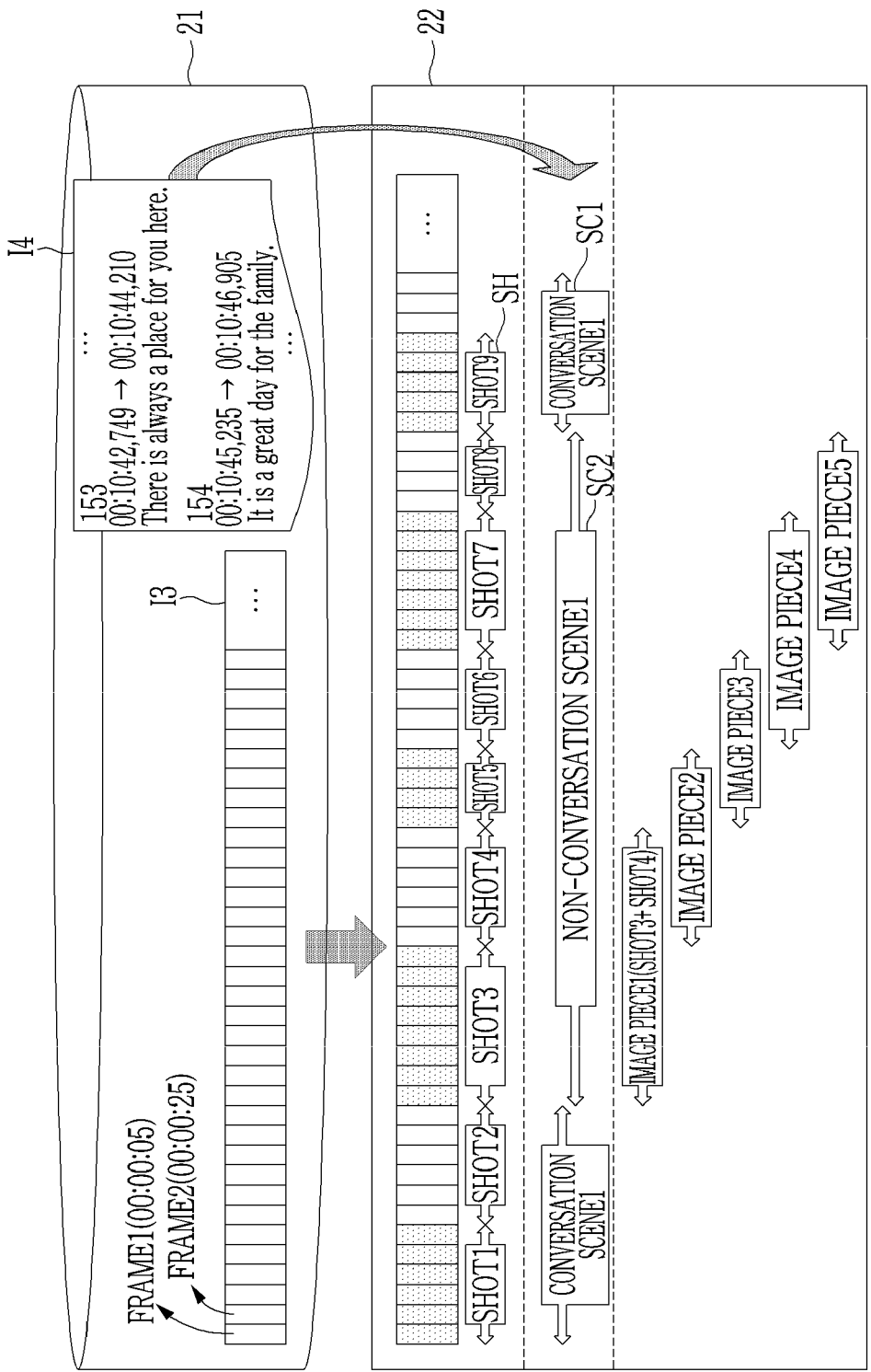
FIG. 3 is a diagram illustrating a process of dividing an image according to an exemplary embodiment of the present invention.

FIG. 3 is a diagram illustrating a process of dividing an image according to an exemplary embodiment of the present invention.

In a case in which the original image I3 to be converted into the immersive media is divided into the plurality of image pieces, the image dividing unit 22 of the immersive media authoring apparatus 1 may divide the original image I3 stored in the contents storing unit 21 into shots SH including a plurality of consecutive frames, which are visually similar to each other, based on similarity of visual characteristic information between image frames, as illustrated in FIG. 3. For example, the image dividing unit 22 may divide the original image I3 into a shot 1, a shot 2, a shot 3, . . . , a shot 9, which are a plurality of shots.

In addition, a conversation scene SC1 and a non-conversation scene SC2 are obtained based on the caption information I4. Specifically, the caption information I4 includes a caption reproduction time, where a reproduction time interval of captions included in two consecutive shots is calculated using the caption reproduction time of the caption information I4 corresponding to the time section of the shot SH, and the calculated reproduction time interval is compared with a predetermined threshold value. In a case in which the reproduction time interval of the two consecutive shots is shorter than the predetermined threshold value, it is determined that the corresponding two shots are shots corresponding to consecutive conversation scenes. Through the above-mentioned operation, the conversation scene SC1 including the plurality of consecutive shots may be determined. In addition, the non-conversation scene SC2 including the consecutive shots positioned between the determined conversation scenes SC1 may be obtained.

The image pieces (an image piece 1, an image piece 2, etc.), which are inputs of the immersive effect classification may be obtained by dividing the plurality of shots corresponding to the non-conversation scene SC2 in a sliding window manner. For example, a size of the sliding window corresponds to two shots, and when the size of the sliding window moving at one time is set to one shot, the non-conversation scene including six consecutive shots may be divided into five image pieces.

After the original image is divided into the plurality of image pieces for the immersive effect classification through the operation of dividing the image as described above, the immersive media authoring apparatus 1 classifies the image piece into the immersive effect type by applying the learned immersive effect classifier to each of the plurality of image pieces (S120).

Figure 4:
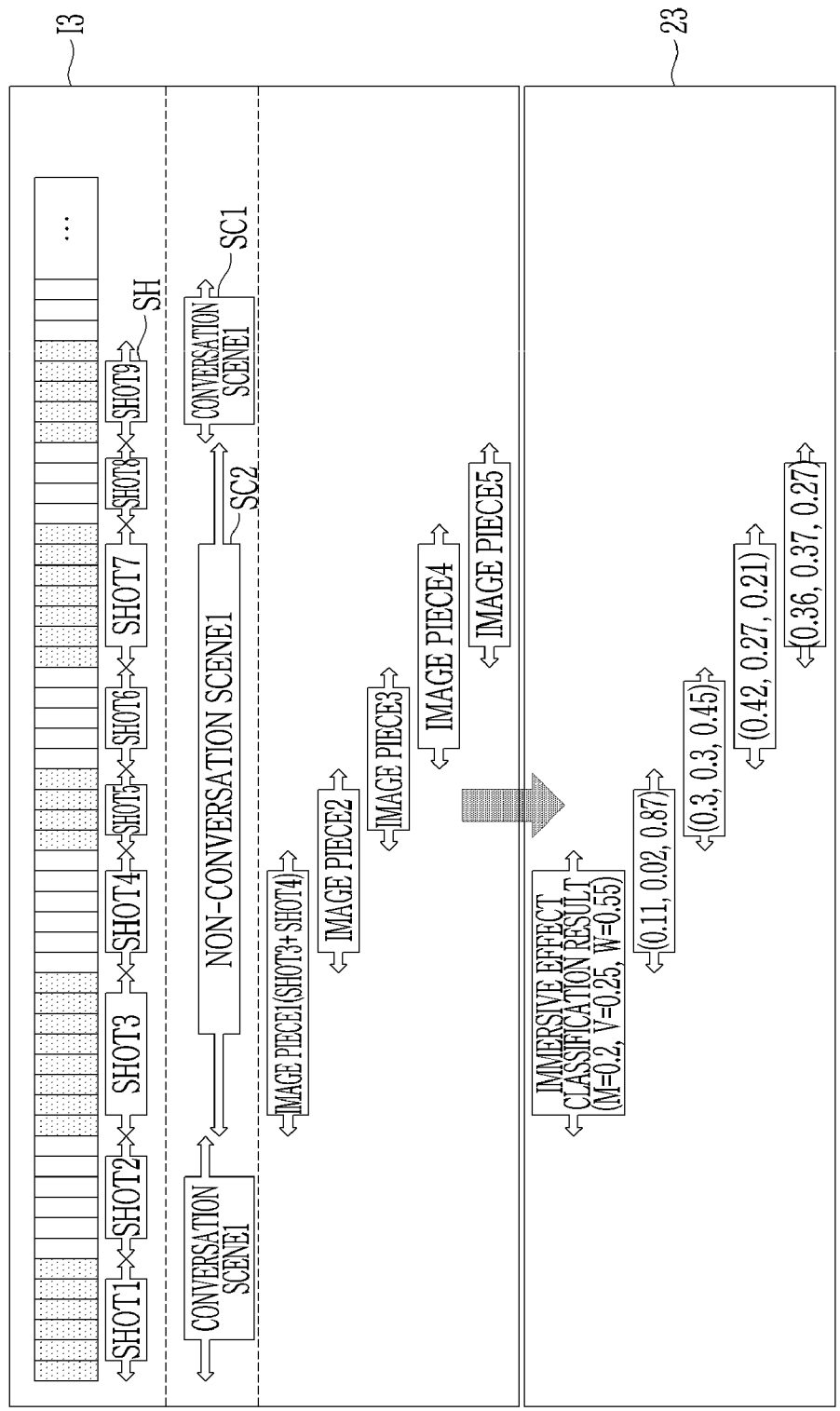
FIG. 4 is a diagram illustrating a process of classifying an immersive effect type according to an exemplary embodiment of the present invention.

FIG. 4 is a diagram illustrating a process of classifying an immersive effect type according to an exemplary embodiment of the present invention.

As illustrated in FIG. 4, the immersive media authoring apparatus 1 applies the immersive effect classifier 13 to each of the image pieces to classify the corresponding image piece into one immersive effect type. For example, for the plurality of image pieces (an image piece 1, an image piece 2, . . . , an image piece 5) obtained from the non-conversation scene through the process of dividing the image of FIG. 3 described above, the immersive effect authoring apparatus 1 classifies each image piece into any immersive effect type by using the immersive effect classifier 13. Here, a degree that the image piece is classified into any immersive effect type may be predicted as a numerical value (referred to as a prediction value, for convenience of explanation). For example, as illustrated in FIG. 4, when the immersive effect classifier 23 of the immersive media authoring apparatus 1 determines the three kinds of immersive effect types of the motion effect M, the vibration effect V, and the wind effect W using the learned immersive effect classifier 13, the immersive media authoring apparatus 1 may obtain the prediction value by performing a prediction that represents a degree for each of the immersive effects, that is, the motion effect M, the vibration effect V, and the wind effect W for the image pieces. For example, it may be predicted for the image piece 1 that M=0.2, V=0.25, and W=0.55. In this case, the type having the greatest value among the prediction values of the respective types is determined as the immersive effect type of the corresponding image piece. Accordingly, the image piece 1 may be classified into the immersive effect type of the wind effect. The prediction values corresponding to the three kinds of the immersive effect types are predicted for the remaining image pieces, and the immersive effect types may be determined based on the prediction values.

Next, the immersive media authoring apparatus 1 detects the immersive effect section based on the immersive effect classification results for each of the plurality of image pieces, and particularly detects the maximum image section of the immersive effect by matching the immersive effect classification results for each of the plurality of image pieces of the divided image (S130).

Figure 5:
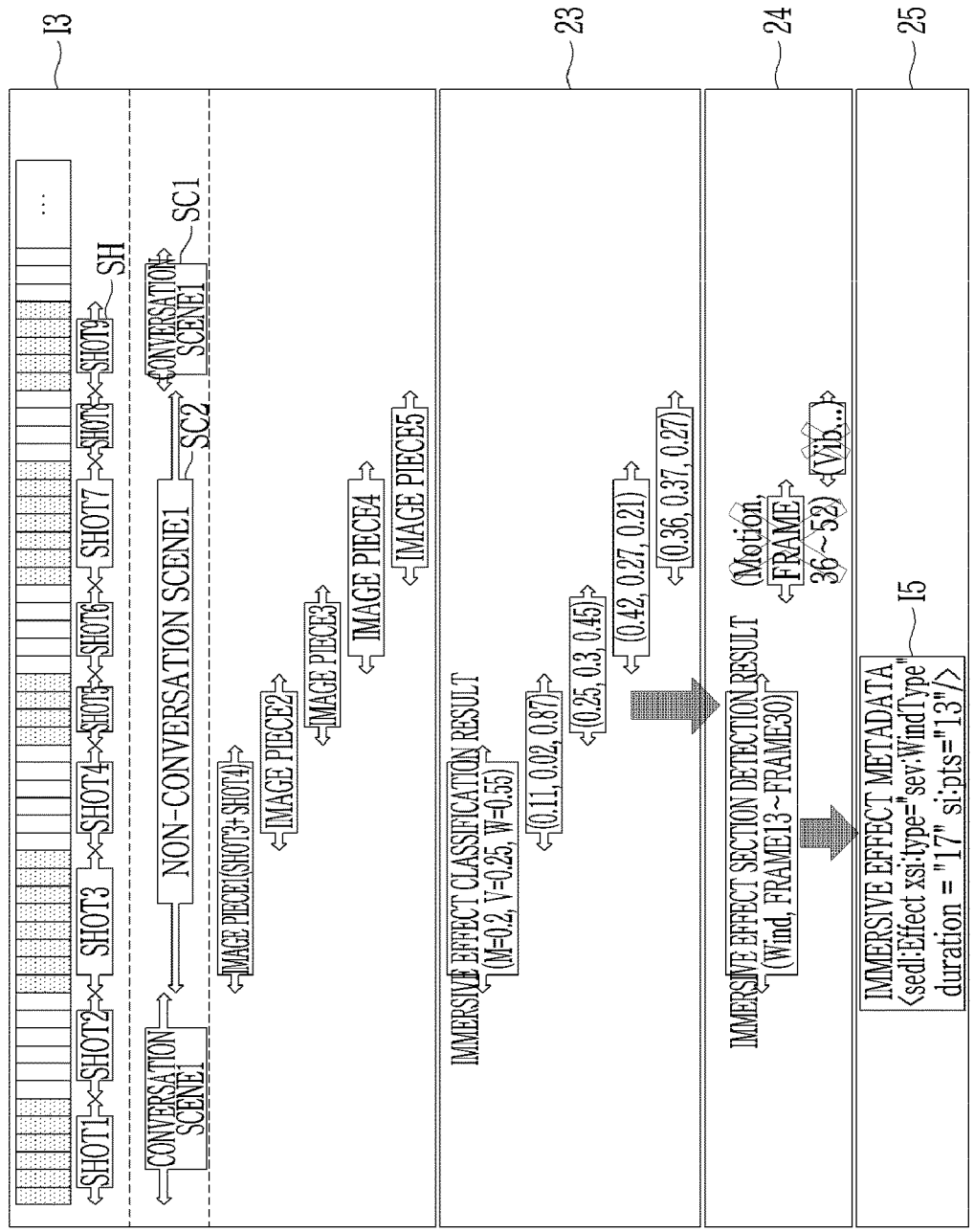
FIG. 5 is a diagram illustrating a process of detecting an immersive effect section according to an exemplary embodiment of the present invention.

FIG. 5 is a diagram illustrating a process of detecting an immersive effect section according to an exemplary embodiment of the present invention.

The immersive effect section detecting unit 24 of the immersive media authoring apparatus 1 may detect the maximum image section corresponding to the same immersive effect type by matching the immersive effect classification results as illustrated in FIG. 4. The immersive effect section, which is the maximum image section corresponding to the same immersive effect type may include a plurality of shots included in the non-conversation scene SC2. Therefore, a boundary of the immersive effect section has characteristics that it coincides with a boundary of the shot to be in parallel therewith. The immersive effect section detecting unit 24 may determine the maximum image section corresponding to the same immersive effect type by taking into account the minimum classification prediction numerical value of the immersive effect type to be matched, the minimum size of the detection section, and whether or not heterogeneous immersive effect types overlap with each other.

The immersive effect type having the greatest value among the prediction values for each of the immersive effect types which are predicted according to the immersive effect classification for the image pieces may be determined as the immersive effect type of the corresponding image piece.

For example, as illustrated in FIGS. 4 and 5, when the prediction value for the image piece 1 is M=0.2, V=0.25, and W=0.55, the image piece 1 may be classified into the wind effect according to W=0.55 having the greatest value, and when the prediction value for the image piece 2 is M=0.11, V=0.02, and W=0.87, the image piece 2 may also be classified into the wind effect according to W=0.87 having the greatest value. Further, when the prediction value for the image piece 3 is M=0.3, V=0.3, and W=0.4, the image piece 3 may be classified into the wind effect according to W=0.4 having the greatest value. Further, when the prediction value for the image piece 4 is M=0.42, V=0.27, and W=0.21, the image piece 4 may be classified into the motion effect according to W=0.42 having the greatest value. Further, when the prediction value for the image piece 5 is M=0.36, V=0.37, and W=0.27, the image piece 5 may be classified into the vibration effect according to W=0.37 having the greatest value.

The maximum image section corresponding to the same immersive effect type is detected based on such an immersive effect classification result. Here, the maximum image section is detected based on the minimum classification prediction numerical value of the immersive effect type, the minimum size of the detection section, and whether or not the heterogeneous immersive effect types overlap with each other. For example, it is assumed that the minimum classification prediction numerical value of each immersive effect type is 0.3 and the minimum size of the detection section is 10 frames. When the maximum image section corresponding to the same immersive effect type is detected, a section which is shorter than the minimum size of the set detection section, a section in which the prediction value of the immersive effect type is smaller than the minimum classification prediction numerical value, and a section which overlaps with the section of another immersive effect type may be excluded from a final section detection result.

For example, in FIG. 5, according to the image piece 1, the image piece 2, and the image piece 3 which are classified into the wind effect type in the same way, it may be detected that the maximum image section corresponding to the wind effect type is from first frame (an immersive effect start time) of the image piece 1 to a last frame of the image piece 3, but in this case, since the image piece 3 includes a portion which overlaps with the image piece 4 which is another immersive effect type, the maximum image section corresponding to the wind effect type is finally from the first frame of the image piece 1 to the last frame of the image piece 2, for example, from a frame 13 to a frame 30. Here, since the size of the maximum image section corresponding to the wind effect type is greater than the minimum size of the preset detection section, the maximum image section corresponding to the wind effect type is processed as a detection target.

Meanwhile, it may be detected that the maximum image section corresponding to the motion effect is a first frame of the image piece 4 to the last frame thereof, but since a front portion of the image piece 4 overlaps with the image piece 3, which is another immersive effect type, it is excluded from the motion effect section. On the other hand, a rear portion which is classified into the vibration effect type, but overlaps with the image piece 5 having the motion prediction numerical value of 0.36 which is greater than the minimum classification prediction numerical value of 0.3 may be detected as a final motion effect section. However, since the final motion effect section is smaller than 10 frames, which are the minimum size of the preset detection section, the maximum image section corresponding to the motion effect type is excluded from the detection. Further, it may be detected that the maximum image section corresponding to the vibration effect type is a first frame of the image piece 5 to the last frame thereof, but a portion of the image piece 5 overlaps with the image piece 4, which is another immersive effect type. Here, since the size of the section based on the frames except for the overlapped portion is smaller than the minimum size of the set detection section, the maximum image section corresponding to the vibration effect type is excluded from the detection. As a result, as illustrated in FIG. 5, the maximum image section corresponding to the wind effect type is detected.

As described above, after the maximum image section of the immersive effect is detected, the immersive effect metadata is generated based on the detected maximum image section of the immersive effect (S140). The immersive effect metadata includes an immersive effect type, an immersive effect start time, and an immersive effect end time.

For example, as illustrated in FIG. 5, the immersive effect metadata generating unit 25 of the immersive media authoring apparatus 1 generates the immersive effect metadata for the maximum image section corresponding to the wind effect type based on the immersive effect section detection result. The immersive effect metadata may include the immersive effect type of "wind type", the immersive effect start time of "13" corresponding to the frame 13, and the immersive effect end time, which is the section information "17", which is a difference between the frame 30 and the frame 13. The immersive effect metadata is not limited to such a structure, but may be expressed according to international standards (e.g., ISO/IEC 23005 (MPEG-V)) for compatibility with each other.

The immersive effect metadata generated based on the processes as described above is mapped to the image I3 to be converted into the immersive media, and is stored and managed in the immersive media storing unit 26.

Figure 6:
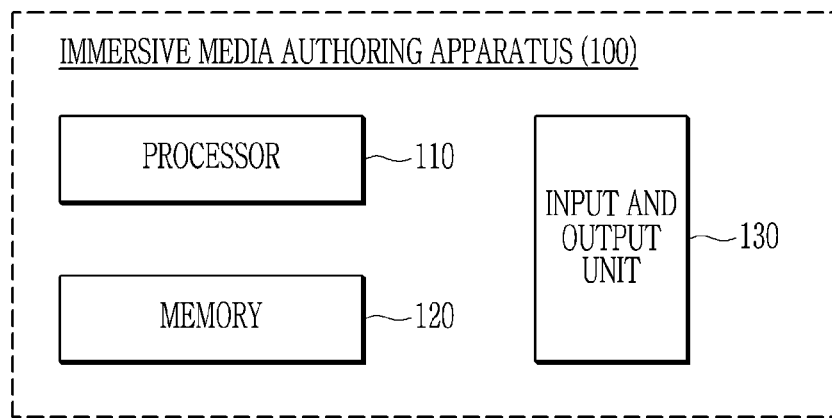
FIG. 6 is a structure diagram of another apparatus for authoring an immersive media according to an exemplary embodiment of the present invention.

FIG. 6 is a structure diagram of another apparatus for authoring an immersive media according to an exemplary embodiment of the present invention.

As illustrated in FIG. 6, an immersive media authoring apparatus 100 according to an exemplary embodiment of the present invention includes a processor 110, a memory 120, and an input and output unit 130. The processor 110 may be configured to implement the methods described with reference to FIGS. 1 to 5. For example, the processor 110 may be configured to perform functions of the immersive effect classifier learning unit, the immersive effect classifier, the image dividing unit, the immersive effect classifying unit, the immersive effect section detecting unit, and the immersive effect metadata generating unit.

The memory 120 is connected to the processor 110 and stores various information related to the operations of the processor 110. The memory 120 may store instructions for operations to be performed by the processor 110, or load the instructions from a storage device (not shown) and temporarily store the loaded instructions. Further, the memory 120 may be configured to perform functions of, for example, the training data storing unit and the immersive media storing unit.

The processor 110 may execute the instructions which are stored or loaded in the memory 120. The processor 110 and the memory 120 are connected to each other through a bus (not shown), and the bus may also be connected to an input/output interface (not shown).

The input and output unit 130 is configured to output a processing result of the processor 110 or to input any data to the processor 110.

According to an embodiment of the present invention, the immersive effect classifier is learned using the existing immersive media and the immersive effect section is detected from the new image through the learned immersive effect classifier, thereby making it possible to authorize the immersive media. As a result, anyone may easily and automatically convert the general image into the immersive media.

The exemplary embodiments of the present invention are not implemented only by the apparatus and/or method described above. Alternatively, the exemplary embodiments may also be implemented by a program for performing functions which correspond to the configuration of the exemplary embodiments of the present invention, a recording medium on which the program is recorded, and the like. These implementations may be easily devised from the description of the exemplary embodiments by those skilled in the art to which the present invention pertains.

While the exemplary embodiments of the present invention have been described in detail, it is to be understood that the invention is not limited to the disclosed embodiments, but on the contrary, is intended to cover various modifications and equivalent arrangements included within the spirit and scope of the appended claims.

What is claimed is:

1. An apparatus for authoring an immersive media, the apparatus comprising:
    an immersive effect classifying unit determining an immersive effect type of an original image having image contents to be converted into an immersive media by using an immersive effect classifier learned using an existing immersive media in which the immersive effect had already been added to an image;
    an immersive effect section detecting unit detecting an immersive effect section of the original image based on the immersive effect type determination result of the immersive effect classifying unit; and
    an immersive media generating unit generating metadata of the detected immersive effect section.

2. The apparatus of claim 1, wherein:
    the immersive effect classifying unit obtains a prediction value that predicts a degree that the original image corresponds to an immersive effect type using the learned immersive effect classifier.

3. The apparatus of claim 2, wherein:
    the immersive effect classifying unit determines the immersive effect type having the greatest prediction value among prediction values predicted for each of the immersive effect types for the original image, as the immersive effect type of the original image.

4. The apparatus of claim 1, further comprising:
    an image dividing unit dividing the original image into a plurality of image pieces,
    wherein the immersive effect classifying unit classifies each image piece into an immersive effect type.

5. The apparatus of claim 4, wherein:
    the image dividing unit divides the original image into shots including a plurality of consecutive frames which are visually similar to each other, based on similarity of visual characteristic information between image frames, obtains a non-conversation scene including consecutive shots and positioned between conversation scenes based on caption information of the image contents, and divides the non-conversation scene into a plurality of image pieces.

6. The apparatus of claim 5, wherein:
    when a reproduction time interval of captions included in two consecutive shots is shorter than a preset threshold value by using a caption reproduction time of the caption information corresponding to a time section of the shot, the image dividing unit determines the consecutive shots as the shots corresponding to consecutive conversation scenes, and obtains the non-conversation scene positioned between the determined conversation scenes and including the consecutive shots.

7. The apparatus of claim 5, wherein:
    the image dividing unit divides the non-conversation scene by combining, using a sliding window, one or more of the consecutive shots included in the non-conversation scene to obtain each of the plurality of image pieces.

8. The apparatus of claim 4, wherein:
    the immersive effect section detecting unit detects a maximum image section of a corresponding immersive effect type by matching the image pieces having the same immersive effect type based on the immersive effect type classification result for each image piece, and the detected maximum image section includes a plurality of shots belonging to the non-conversation scene.

9. The apparatus of claim 8, wherein:
    the immersive effect section detecting unit determines the maximum image section by taking into account a minimum classification prediction numerical value of the immersive effect type, the minimum size of the detection section, and whether or not heterogeneous immersive effect types overlap with each other.

10. The apparatus of claim 8, wherein:
    the metadata of the detected immersive effect section includes an immersive effect type, an immersive effect start time, and an immersive effect end time.

11. The apparatus of claim 1, further comprising:
    an immersive media learning processing unit learning the immersive effect classifier that classifies an input image into the immersive effect type by using the existing immersive media in which the immersive effect has already been added to the image to provide the learned immersive effect classifier.

12. The apparatus of claim 11, wherein:
    the immersive media learning processing unit includes an immersive effect classifier learning unit learning the immersive effect classifier using training data including a digital image and an immersive effect label, which is immersive effect information added to the image, to obtain the learned immersive effect classifier based on a machine learning algorithm.

13. The apparatus of claim 12, wherein:
    the immersive effect label of the training data includes an immersive effect type, an immersive effect start time, and an immersive effect end time, and further includes at least one of immersive effect intensity, an immersive effect direction, and an immersive effect period according to the immersive effect type.

14. The apparatus of claim 13, wherein:
    the digital image of the training data includes a plurality of image pieces which are divided according to the immersive effect start time and the immersive effect end time of the immersive effect label.

15. A method for authoring an immersive media by an apparatus for authoring an immersive media, the method comprising:
    dividing an original image to be converted into the immersive media into a plurality of image pieces for an immersive effect classification;
    determining an immersive effect type for each of the image pieces by using an immersive effect classifier learned using an existing immersive media in which the immersive effect has already been added to an image;

detecting an immersive effect section based on the immersive effect type for each of the image pieces; and generating metadata of the detected immersive effect section.

16. The method of claim 15, wherein:

the dividing of the original image into the plurality of image pieces includes:

dividing the original image into shots including a plurality of consecutive frames which are visually similar to each other, based on similarity of visual characteristic information between image frames;

obtaining a non-conversation scene positioned between conversation scenes and including consecutive shots based on caption information of the original image; and dividing the non-conversation scene into the plurality of image pieces.

17. The method of claim 15, further comprising:

determining the immersive effect type;

obtaining a prediction value that predicts a degree that the image piece corresponds to an immersive effect type by using the learned immersive effect classifier; and determining the immersive effect type having the greatest prediction value among prediction values predicted for each of the immersive effect types for the image piece, as the immersive effect type of the image piece.

18. The method of claim 15, wherein:

the detecting of the immersive effect section includes detecting a maximum image section of a corresponding immersive effect type by matching the image pieces having the same immersive effect type based on the immersive effect type for each of the image pieces, and in the generating of the metadata, metadata including an immersive effect type, an immersive effect state time, and an immersive effect end time of the maximum image section is generated.

19. The method of claim 18, wherein:

in the detecting of the maximum image section, a section which is shorter than the minimum size of a set detection section, a section in which the prediction value of the immersive effect type is smaller than a minimum classification prediction numerical value, and a section which overlaps with a section of another immersive effect type among sections detected based on the image pieces are excluded from a section detection result.

20. The method of claim 15, wherein:

the detecting of the immersive effect section includes detecting an immersive effect section in which a start time and an end time of the immersive effect are determined, based on the immersive effect type classification result for the image pieces, and in the generating of the metadata, metadata including an immersive effect type, an immersive effect state time, and an immersive effect end time of the immersive effect section is generated.

* * * * *